United States Patent
Schreher et al.

(10) Patent No.: US 8,240,912 B2
(45) Date of Patent: Aug. 14, 2012

(54) MULTI-ZONE NON-CONTACT SPOT THERMOMETER

(75) Inventors: Medwin E. Schreher, Santa Cruz, CA (US); Kenneth A. Pomper, Aptos, CA (US)

(73) Assignee: Fluke Corporation, Everett, WA (US)

( * ) Notice: Subject to any disclaimer, the term of this patent is extended or adjusted under 35 U.S.C. 154(b) by 1034 days.

(21) Appl. No.: 12/192,720

(22) Filed: Aug. 15, 2008

(65) Prior Publication Data

US 2010/0040109 A1   Feb. 18, 2010

(51) Int. Cl.
*G01J 5/00* (2006.01)

(52) U.S. Cl. ........................ 374/124; 374/100
(58) Field of Classification Search ............... 374/100, 374/124, 110, 120–121, 130, 166; 250/338.1, 250/353

See application file for complete search history.

(56) References Cited

U.S. PATENT DOCUMENTS

| | | | |
|---|---|---|---|
| 3,619,059 A | 11/1971 | Muller et al. | |
| 4,005,605 A * | 2/1977 | Michael | 374/129 |
| 4,215,273 A * | 7/1980 | Frosch et al. | 250/347 |
| 4,300,823 A * | 11/1981 | Yamanaka et al. | 396/106 |
| 4,315,150 A | 2/1982 | Darringer et al. | |
| 4,326,798 A | 4/1982 | Kahn | |
| 4,343,182 A | 8/1982 | Pompei | |
| 4,634,294 A | 1/1987 | Christol et al. | |
| 4,948,258 A * | 8/1990 | Caimi | 356/603 |
| 5,172,978 A | 12/1992 | Nomura et al. | |
| 5,335,308 A | 8/1994 | Sorensen | |
| 5,352,039 A | 10/1994 | Barral et al. | |
| 5,368,392 A | 11/1994 | Hollander et al. | |
| 5,399,018 A | 3/1995 | Hollander et al. | |
| 5,561,294 A | 10/1996 | Iddan | |
| 5,584,137 A | 12/1996 | Teetzel | |
| 5,628,034 A | 5/1997 | McIntyre | |
| 5,653,537 A * | 8/1997 | Ignatowicz et al. | 374/131 |
| 5,675,408 A | 10/1997 | Samuelsson et al. | |
| 5,796,517 A | 8/1998 | Sensui et al. | |
| 5,823,679 A | 10/1998 | Hollander et al. | |
| 5,836,694 A | 11/1998 | Nguyen | |
| 5,839,829 A | 11/1998 | Litvin et al. | |
| 6,012,840 A * | 1/2000 | Small et al. | 374/126 |
| 6,095,682 A | 8/2000 | Hollander et al. | |
| 6,127,679 A * | 10/2000 | Ashley et al. | 250/252.1 |

(Continued)

FOREIGN PATENT DOCUMENTS

DE   3213955   10/1982

(Continued)

OTHER PUBLICATIONS

Office Action for Chinese Patent Application No. 2009102116092 and English Translation, 5 pages.

(Continued)

*Primary Examiner* — Peter Macchiarolo
*Assistant Examiner* — Tania Courson
(74) *Attorney, Agent, or Firm* — Fredrikson & Byron, PA (57) ABSTRACT

A non-contact measurement device includes two or more detectors for sensing scene data from corresponding measurement zones within a target scene. Devices further include an optical system for imaging scene data from the target scene onto the detectors. The optical system is configured to provide a different optical profile for each detector, such that the device can be used to provide a best-fit optical profile for a variety of non-contact applications.

38 Claims, 7 Drawing Sheets

U.S. PATENT DOCUMENTS

| | | | |
|---|---|---|---|
| 6,196,714 | B1 | 3/2001 | Bellifemine et al. |
| 6,234,669 | B1 | 5/2001 | Kienitz et al. |
| 6,266,911 | B1 | 7/2001 | Suzuki |
| 6,377,400 | B1 | 4/2002 | Hollander |
| 6,585,409 | B2 | 7/2003 | Schmidt et al. |
| 6,742,927 | B2 | 6/2004 | Bellifemine |
| 6,765,653 | B2 | 7/2004 | Shirai et al. |
| 6,891,141 | B2 | 5/2005 | Kaneko et al. |
| 6,951,411 | B1 | 10/2005 | Kumar et al. |
| 6,960,749 | B1 | 11/2005 | Nakamura |
| 7,093,974 | B2 * | 8/2006 | Kienitz ............ 374/121 |
| 7,355,178 | B2 * | 4/2008 | Everest ............ 250/338.1 |
| 7,537,381 | B2 * | 5/2009 | Hollander et al. ............ 374/142 |
| 7,800,625 | B2 * | 9/2010 | Liu et al. ............ 345/581 |
| 7,990,415 | B2 * | 8/2011 | Matsumoto et al. ............ 348/136 |
| 8,011,827 | B1 * | 9/2011 | Djeu ............ 374/161 |
| 2002/0027594 | A1 | 3/2002 | Beier et al. |
| 2002/0048307 | A1 | 4/2002 | Schmidt |
| 2002/0078221 | A1 | 6/2002 | Blackwell et al. |
| 2002/0122248 | A1 | 9/2002 | Heinrich |
| 2003/0195046 | A1 * | 10/2003 | Bartsch ............ 463/49 |
| 2004/0140430 | A1 | 7/2004 | Micko |
| 2004/0196888 | A1 | 10/2004 | Musbach et al. |
| 2004/0264542 | A1 | 12/2004 | Kienitz |
| 2005/0279940 | A1 * | 12/2005 | Everest ............ 250/338.1 |
| 2006/0098710 | A1 | 5/2006 | Kienitz |
| 2006/0114966 | A1 | 6/2006 | Kienitz |
| 2006/0152737 | A1 | 7/2006 | Carlson et al. |

FOREIGN PATENT DOCUMENTS

| | | |
|---|---|---|
| DE | 3403372 | 7/1985 |
| DE | 4440843 | 5/1995 |
| DE | 9422197 | 4/1998 |
| DE | 19654276 | 6/1998 |
| DE | 19654211 | 8/1998 |
| EP | 0644408 | 3/1995 |
| EP | 1085307 | 3/2001 |
| EP | 1176407 | 1/2002 |
| EP | 1643226 A2 | 4/2006 |
| GB | 0696604 | 9/1953 |
| GB | 2380791 | 4/2003 |
| JP | 57022521 | 5/1982 |
| WO | 2005012859 A1 | 2/2005 |

OTHER PUBLICATIONS

Partial European Search Report for European App. No. 09251968.5, dated Dec. 10, 2009, 4 pages.

Extended European Search Report for European App. No. 09251968.5, dated Mar. 2, 2010, 11 pages.

* cited by examiner

MULTI-ZONE NON-CONTACT SPOT THERMOMETER

FIELD

This disclosure generally relates to non-contact temperature measurement and more particularly relates to non-contact temperature measurement with infrared spot detectors.

BACKGROUND

Non-contact temperature-measuring devices, as they are known in the art, usually comprise an infrared detector for receiving infrared radiation emanating from a measurement spot or zone on an object of measurement, an optical system for imaging the infrared radiation emanating from the measurement spot onto the detector, and a sighting arrangement for identifying the position and size of the measurement zone on the object of measurement. A further processing arrangement which converts the infrared detector signal into a temperature indication is also usually connected to the detector.

In many such devices, the optical system is designed so that only infrared radiation from a measurement spot or zone within the target scene or object of measurement is focused onto the detector at a given measurement distance. In most cases the measurement zone is defined as the area from which a large portion (greater than 50% and typically 90% or more) of the infrared rays focused onto the detector strike. Infrared spot detectors are useful for measuring the average temperature of the area of the measurement zone, but are generally not able to resolve separate temperature zones within the measurement zone.

The size of the measurement zone usually varies with the measurement distance from the measuring device to the target scene or object. This variation in measurement zone size can be referred to as the optical profile and generally depends upon the design of the optical system. Examples of commonly used measurement profiles include standard focus and close focus measurement profiles. For the purposes of this disclosure the term "standard focus" will refer to a measurement profile similar to that shown in FIG. 1A, i.e. where the measurement spot size is constant or increases as the distance from the objective lens increases. The term "close focus" will refer to a measurement profile similar to that of FIG. 1B, i.e. exhibiting a "bow-tie" shape. A close focus profile can be a "near focus" profile having a minimum measurement zone size at a distance of less than one half meter from the lens or a "distant focus" profile having a minimum measurement zone size at a distance of one half meter or greater from the lens. Both close focus and standard focus optical systems are useful in practical applications and non-contact temperature measurement devices are available for each and at a variety of near or distant ranges.

In applications where spot temperatures must be measured at a number of distances it may be desirable to focus the scene image in order to provide a minimal measurement zone size at multiple distances. Similarly, in applications where multiple objects of different sizes are to be measured at the same distance, it is desirable to have multiple measurement zone sizes at that distance to provide a closer fit to each object. Having both a standard focus device and a close focus device can be useful in such situations, however the added cost of a second device often precludes its purchase. In some instances, a single device with focusable optics can be used to overcome the issues of different measurement distances and object sizes, however the ability to adjust a device's optical system can significantly add to the cost of such a device. Similarly, devices which include a single detector moveable relative to the optical system in order to change the device's optical profile are often undesirable because they are more susceptible to breaking and more expensive than fixed position devices. Moreover, in many measurement applications, continuous adjustability is unnecessary because the variations in distance and object size are often discrete. Other difficulties with non-contact temperature measurement that embodiments of the invention address will become apparent throughout the following description.

SUMMARY

A multizone, non-contact spot measurement device is disclosed. Non-contact measurement devices include two or more fixed detectors for sensing scene data from corresponding measurement zones within a target scene and generating signals in response to the sensed data. An optical system of the device including an objective lens system images the scene data onto the detectors such that each detector is provided with a different optical profile. That is, at substantially any given distance from the objective lens system, each measurement zone is different from the other measurement zones of the device. Devices can include close focus optical profiles, standard focus optical profiles, or one or more of both close and standard focus optical profiles. Optical systems can include the positioning and arrangement of the detectors, and in some embodiments, a beam splitter. In some embodiments, the detectors are infrared detectors, the device corresponding to a thermometer. Embodiments of the invention can further include a hand-held housing and sighting means.

In another aspect, embodiments of the invention include a device for infrared temperature measurement having a single specialized detector. Such specialized detectors can have at least two distinct detector regions, each region receiving infrared radiation from a target scene according to different optical profiles. Embodiments according to this aspect include an optical system for imaging target scene radiation according to the different optical profiles onto each region of the specialized detector.

Embodiments of the invention thus provide a device for simultaneous, non-contact temperature measurement of multiple zones of a target scene. Such devices eliminate the need for a user to own multiple non-contact measurement devices for measuring different objects within a scene or objects at different distances. Moreover, embodiments of the invention provide this functionality with fixed detectors, eliminating the cost and fragility associated with moveable detector devices.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION OF THE PREFERRED EMBODIMENTS

The following detailed description should be read with reference to the drawings, in which like elements in different drawings are numbered identically. It will be understood that embodiments shown in the drawings and described herein are merely for illustrative purposes and are not intended to limit the invention to any embodiment. On the contrary, it is intended to cover alternatives, modifications, and equivalents as may be included within the scope of the invention as defined by the appended claims.

Figure 1A:
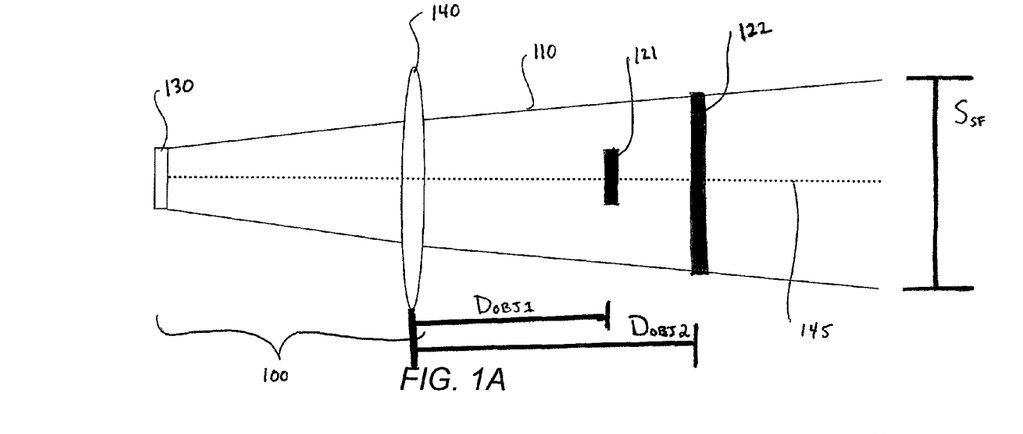
FIG. 1A shows a schematic representation of a standard focus device.

Non-contact thermometers can be used to determine a temperature reading from a target scene or object by sensing radiation from the object. For example, FIG. 1A shows a schematic representation of a non-contact thermometer device 100 and its optical profile 110 with reference to two target objects 121, 121. The device 100 generally includes a detector 130 and an objective lens system 140 arranged about an optical axis 145 such that the lens 140 can direct scene information (usually in the form of infrared radiation) from a target scene or object onto the detector 130. The device shown in FIG. 1A, has been configured in what will be referred to here as a "standard focus" arrangement. In such an arrangement, the measurement spot size ($S_{SF}$) increases or remains constant as the distance (D) from the objective lens 140 increases. In non-contact temperature measurement, it is desirable for the spot size $S_{SF}$ to fit the desired measurement zone or object as closely as possible. For example, the spot size $S_{SF}$ at distance $D_{OBJ2}$ from the device 100 closely fits the second object 122 as indicated by the optical profile 110. A close fit can provide a more accurate reading of the temperature of the target object 122 because the amount of non-target scene radiation imaged to the detector 120 is minimized. By contrast, a measurement of the temperature of the smaller first object 121 at distance $D_{OBJ1}$ from the lens 140, for example, includes extraneous scene data which can throw off the temperature calculation produced by the device 100.

Figure 1B:
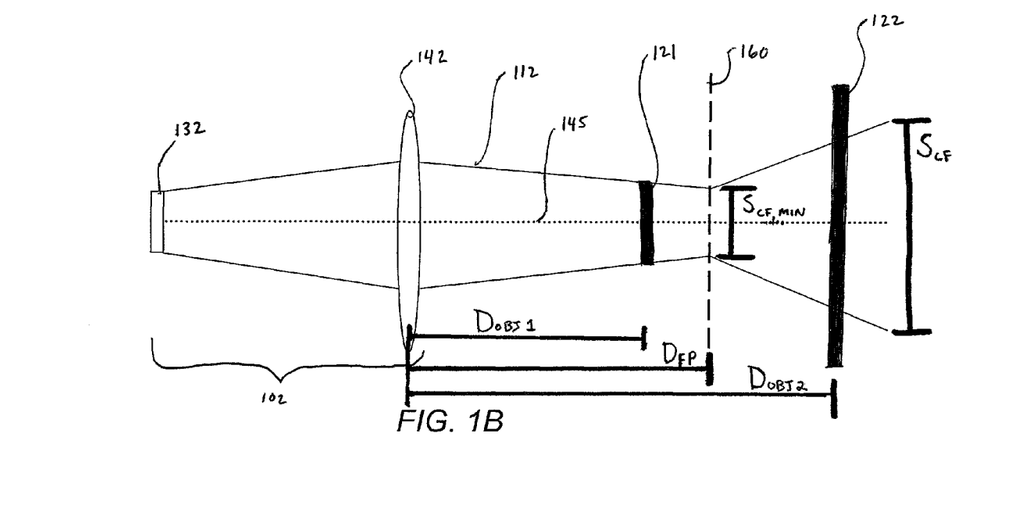
FIG. 1B shows a schematic representation of a close focus device.

FIG. 1B shows a non-contact thermometer device 102 having a "close focus" optical profile 112. In this device 102, the detector 132 and objective lens system 142 are arranged such that the spot size $S_{CF}$ decreases to a minimum spot size $S_{CF,MIN}$ within a focus plane 160 at a distance $D_{FP}$ from the lens 142. Beyond this distance $D_{FP}$, the spot size $S_F$ increases causing the close focus optical profile 112 to exhibit the "bow tie" shape commonly known in the art. Devices using a close focus arrangement can be near focus devices (i.e. $D_{FP}$<one half meter) or distant focus devices (i.e. $D_{FP}$>=one half meter). As shown in FIG. 1B, a close focus optical profile 112 can provide a close fit for certain objects, while providing an inadequate fit for other objects. For example, the optical profile 112 provides a well fit measurement spot size for the first object 121 at distance $D_{OBJ1}$ from the lens 142, and measurement spot size that is too small for the second object 122 at distance $D_{OBJ2}$ from the lens 142.

Embodiments of the invention comprise a non-contact thermometer which simultaneously provides a plurality of optical profiles. Multiple optical profile devices according to the invention can provide readings from multiple, differently-sized measurement zones at substantially any given distance from the objective lens. Thus, embodiments of the invention can be used to provide a best-fit optical target for a range of applications and over a range of distances without the need to switch between modes.

Figure 2:
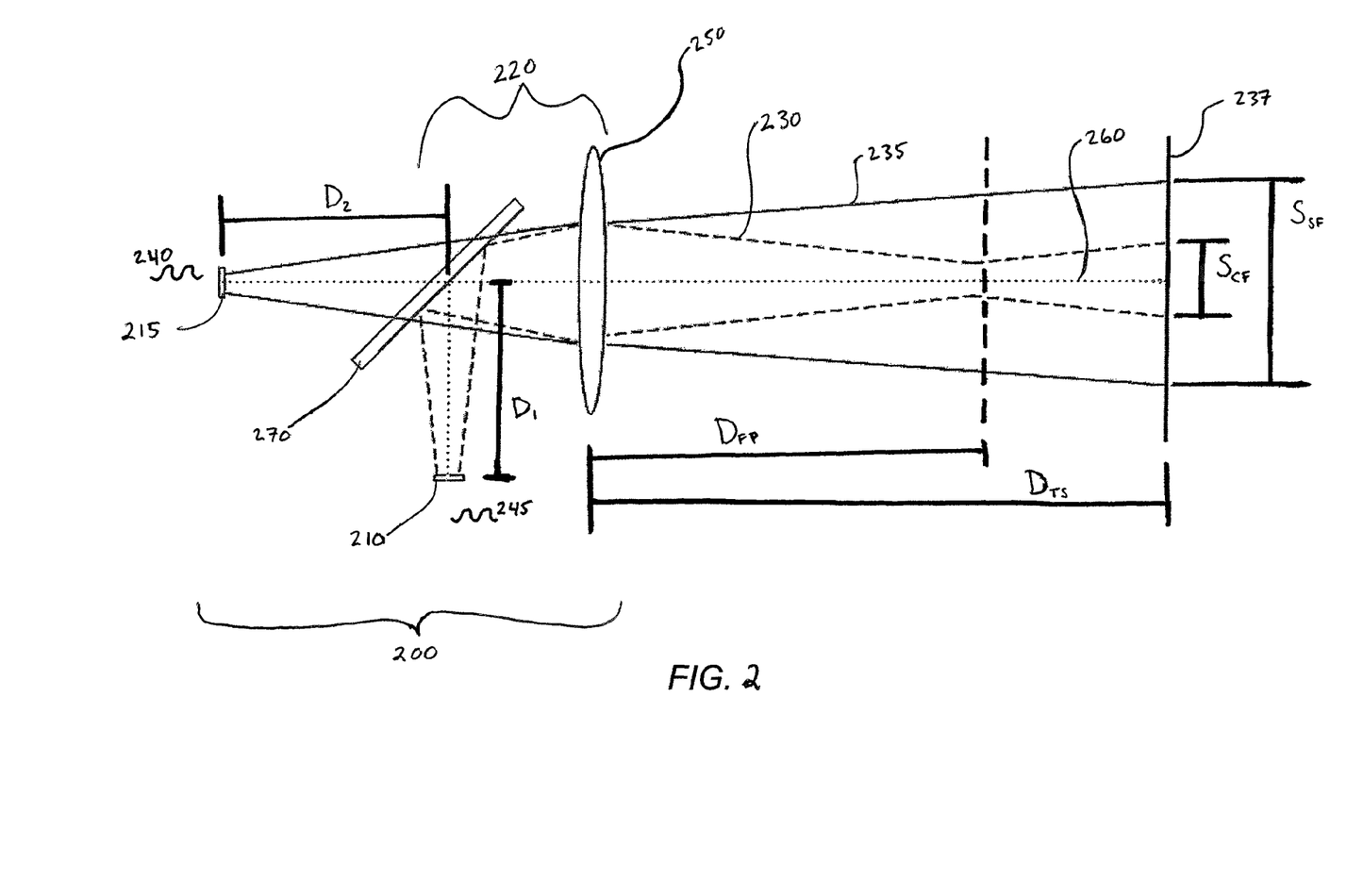
FIG. 2 shows a schematic representation of a device for temperature measurement according to some embodiments of the invention.

FIG. 2 shows a schematic representation of such a temperature measurement device 200 according to some embodiments of the invention. The device 200 generally includes at least two detectors 210, 215 fixedly positioned relative to an optical system 220 which is configured to provide a different optical profile 230, 235 for each detector 210, 215. Thus, at substantially any given distance each detector 210, 215 receives scene data from a different measurement zone having a different spot size. For example, with respect to target scene 237 at distance $D_{TS}$, the first detector 210 receives infrared radiation from the first measurement zone having a spot size $S_{CF}$, and the second detector 215 receives infrared radiation from the second measurement zone having a spot size $S_{SF}$. In such a device 200, the first and second detectors 210, 215 simultaneously receive scene data and generate first and second signals 240, 245 corresponding to the sensed scene information. Each signal can then be processed to provide information about each measurement zone such as, for example, average zone temperature. In application, embodiments of the schematic representation shown in FIG. 2 can be installed within a device housing including components to provide a portable, hand-held non-contact temperature measurement device.

In some embodiments, first and second detectors 210, 215 are both detectors capable of collecting radiation in the infrared range of the electromagnetic spectrum, for example infrared thermal detectors. One of skill in the art will recognize that other detectors (e.g. photon detectors) can be used, and can be used in combination with one or more infrared detectors. The detectors 210, 215 are fixed within the device 200 to provide a more durable device having fewer moving and moveable parts, but the size and positioning of the detectors depends on the characteristics of the optical system. In some embodiments, the detectors are generally circular having a diameter of 0.5 mm to 2 mm. However detectors of any size and shape should be considered within the scope of the invention. Each detector produces a signal 240, 245 as a function of the radiation or other scene data imaged thereupon. These signals can be processed by known methods to indicate a temperature or other metric indicated via the received radiation.

Embodiments of optical systems 220 according to the invention generally include an objective lens system 250, and a specific detector arrangement relative to an optical axis 260 of the objective lens system 250. In some embodiments, the optical system 220 further includes a beam splitter 270 or mirror system for directing the incoming radiation to the arrangement of detectors. In combination, the elements of the optical system 220 present to each detector 210, 215 a different optical profile 230, 235 that simultaneously provides for extracting a reading from multiple zones of the target scene 237. Because of the simultaneous presentation of multiple measurement zones, embodiments of the invention provide a single device, having no moving parts that can be used for both multiple and varying measurement applications without requiring the device to be reconfigured.

The objective lens system 250 provides the image scene to the device 200. In some embodiments, the objective lens system 250 comprises a single lens positioned within an aperture of the device housing. Other lens systems may include multiple lenses. The lenses of the lens system can be concave, convex, or otherwise shaped and can comprise glass, plastic, or other IR transparent materials. While the embodiments shown generally indicate a refractive objective lens system, other objective lens systems (e.g. a reflective system incorporating one or more mirrors to collect the radiation) are within the scope of the invention. In some embodiments, the lens system can be focusable, allowing for adjustment of the focus plane in close focus systems and fine tuning (e.g. narrowing or widening of the optical profile) of distant focus systems.

The optical system 220 of the embodiment shown in FIG. 2 includes a beam splitter 270 and provides a device having simultaneous close focus and distant focus functionality. Here, the beam splitter 270 is positioned on and angled relative to the optical axis 260 such that a portion of the IR radiation entering the device 200 is reflected onto the first detector 210. The unreflected portion of the IR radiation passes through the beam splitter 270 and onto the second detector 215 which has been positioned generally concentrically about the optical axis 260. In this embodiment, the beam splitter 270 has been oriented at approximately 45 degrees relative to the optical axis 260 causing the first detector 210 to be positioned approximately 90 degrees relative to the optical axis 260. Beam splitter 270 can comprise any of a variety of beam splitters known in the art. For example, the beam splitter 270 can be a silicon mirror coated to have a transmissivity of approximately 50% in the IR range.

Figure 6A:
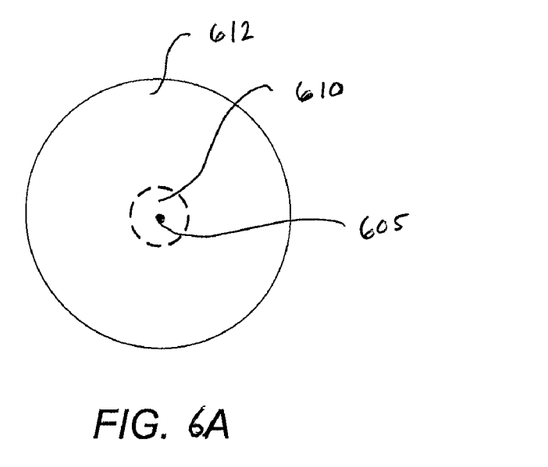
FIGS. 6A-6C show multiple measurement zones according to some embodiments of the invention.
Figure 6B:
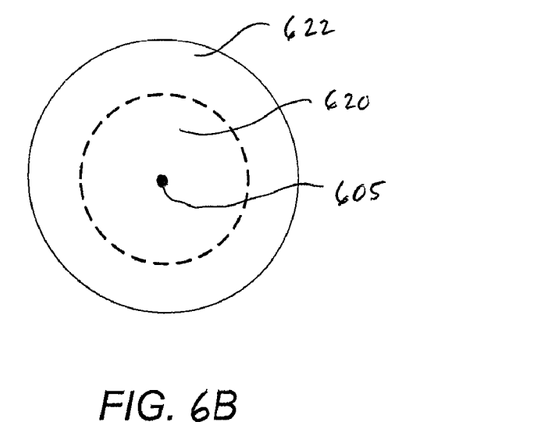

The optical system 220 further includes the specific positioning and arrangement of the detectors. In the embodiment of FIG. 2, the detectors 210, 215 are generally the same size, but are positioned at different fixed distances $D_1$, $D_2$ from the beam splitter 270, and therefore the objective lens system 250. As can be seen by following the optical profile of the first detector 230, $D_1$ has been selected such that the first detector 210 provides close focus functionality. Conversely, as is apparent by following the second optical profile 235, $D_2$ has been selected such that the second detector 215 provides distant focus functionality. FIGS. 6A and 6B depict measurement zone patterns at various distances from the objective lens 250. The pattern of FIG. 6A is representative of the measurement zones at $D_{FP}$. Here, first measurement zone 610 is shown generally concentrically oriented about the optical axis 605, which projects through the page in this view. At this distance, the first, smaller zone 610 is contained entirely within and is generally concentric with the second measurement zone 612. In this optical system orientation, second measurement zone 612 is inclusive of first measurement zone 610, however, in some embodiments signal processing or logic can be used to provide exclusive measurements from each zone. FIG. 6B represents a measurement zone pattern further from or closer to the objective lens 250, for example, at $D_{TS}$. Here, the configuration of the measurement zones can be seen to be generally the same as that of FIG. 6A with first and second zones 620, 622 concentrically disposed about optical axis 605. However, here first measurement zone 620 is significantly larger relative to second measurement zone 622.

Figure 3:
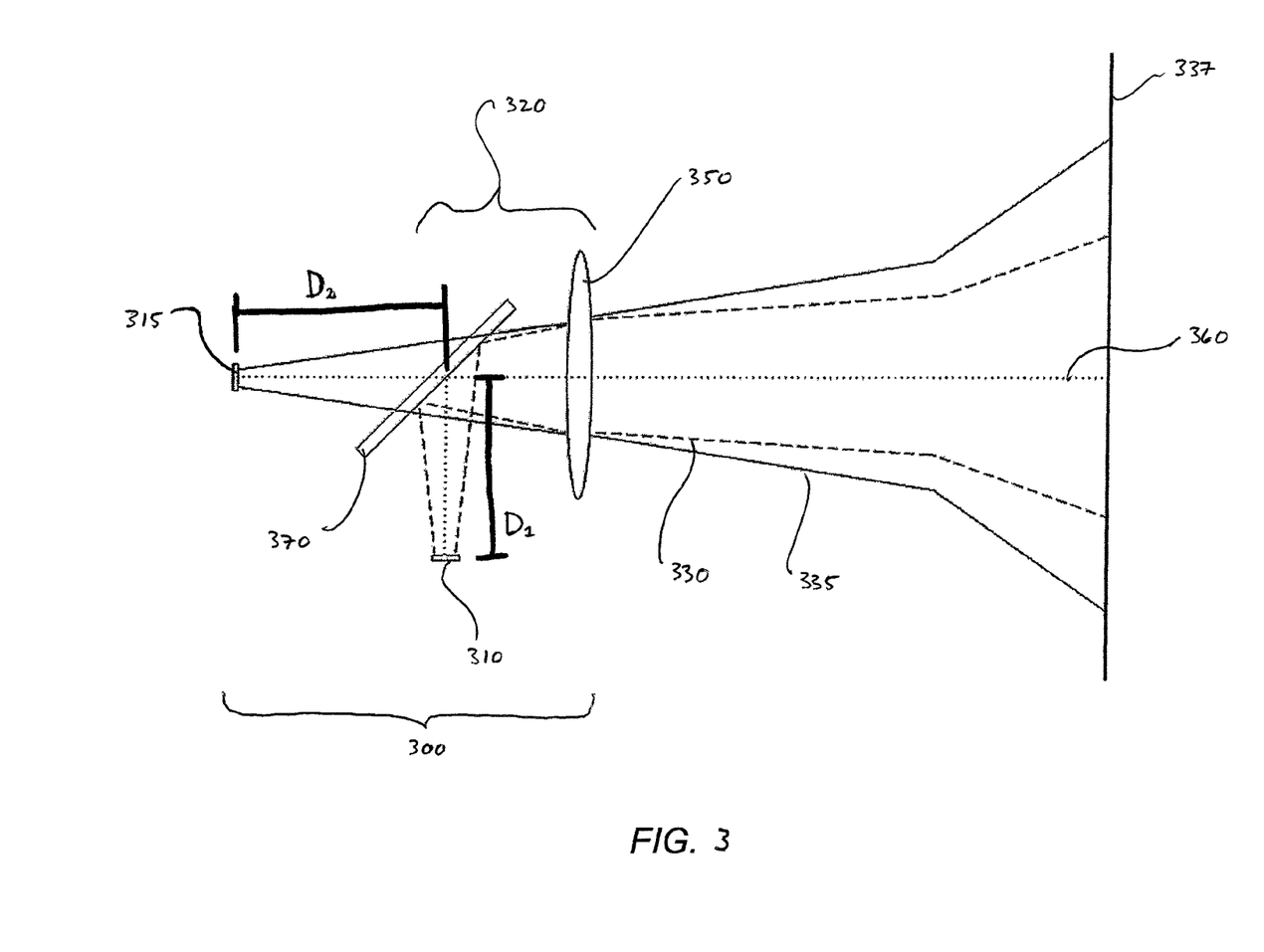
FIG. 3 shows a schematic representation of a device for temperature measurement according to some embodiments of the invention.

FIG. 3 shows an embodiment of a device 300 with an optical system 320 having detectors 310, 315 similarly arranged as in FIG. 2. However, in this embodiment, the first and second detectors 310, 315 are of different size; namely the second detector 315 has a larger active range than the first detector 310. Additionally, here both detectors 310, 315 are positioned at the same distance from the objective lens system 350, that is $D_1=D_2$. Thus, both detectors are positioned to provide the same focus functionality (here standard focus), but with different sized measurement zones as indicated along the optical profiles 330, 335. The measurement zone pattern at any given distance from the lens can correspond to that shown in FIG. 6A or 6B depending on the size ratio between the detectors. One should appreciate that embodiments including detectors having differently sized active ranges can also be arranged to provide close focus functionality. Moreover, embodiments including both close and standard focus functionality can include detectors of different sizes. In such case, either of the close or standard focus detectors can be the larger detector.

Figure 4:
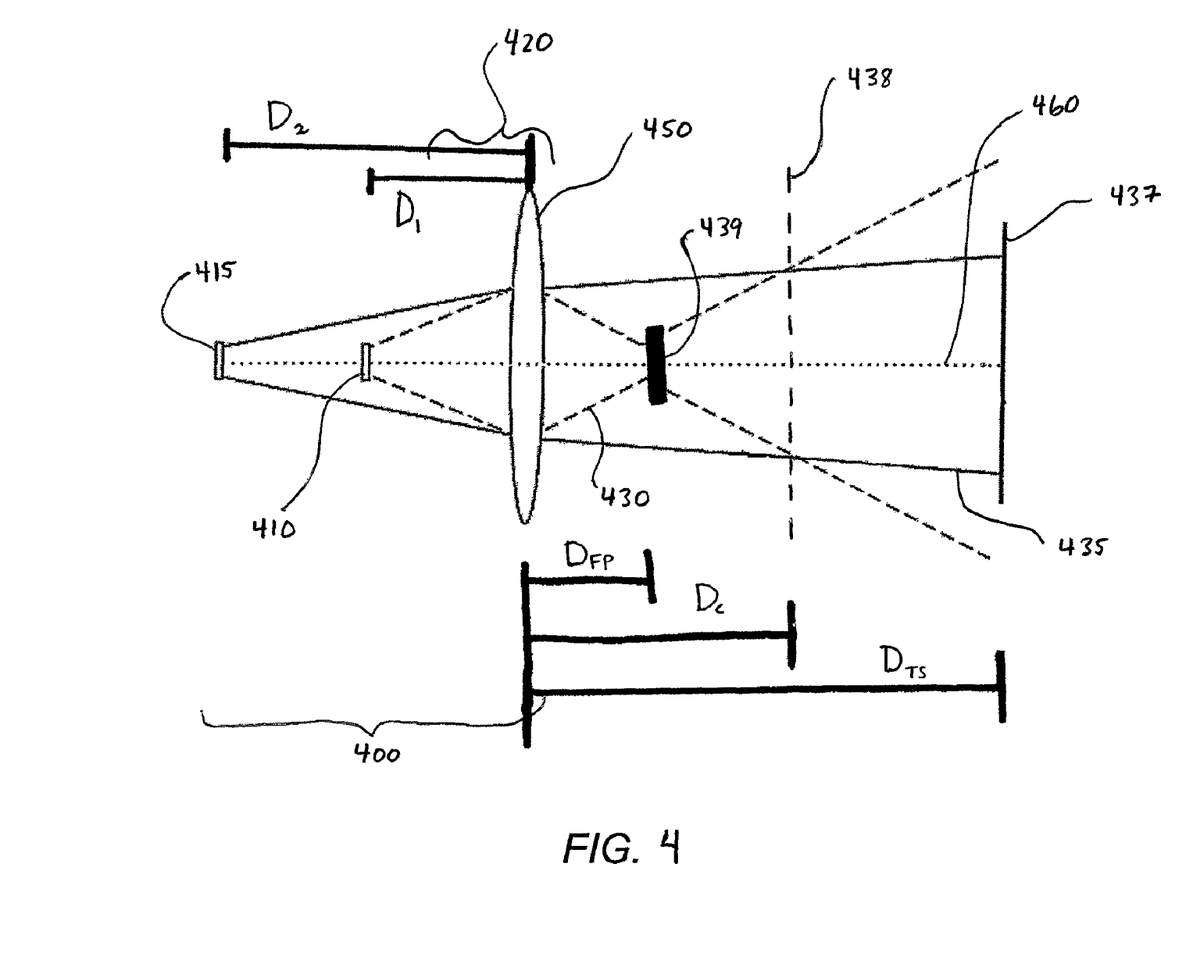
FIG. 4 is shows a schematic representation of a device for temperature measurement according to some embodiments of the invention.

Some embodiments, such as the device 400 of FIG. 4, have an optical system 420 that does not include a beam splitter. Here, the provision of multiple and different optical profiles is accomplished by positioning the detectors in a different arrangement relative to the objective lens system 450. In this embodiment, for example, the first detector 410 is placed on the optical axis 460 at a distance $D_1$ from the objective lens system 450. The second detector 415 is likewise positioned on the optical axis 460, but at a distance $D_2$ from the objective lens system 450. In this embodiment, $D_2$ is greater than $D_1$ such that $D_2$ provides for standard focus functionality to the second detector 415 and $D_1$ provides for close focus functionality from the first detector 410. Of course, the distances $D_1$ and $D_2$ can be selected to provide any other combination of focus arrangements (for example, two close focus profiles, one being near focus, and one being distant focused). Here, it should be recognized that because the first detector 410 is within the optical channel 435 of the second detector 415, a portion of the radiation entering the device 400 may not reach the second detector 415. Thus, while the measurement zone of the first detector is commensurate with the first measurement zone 610 of FIG. 6A, at certain distances from the objective lens 450 the second measurement zone 612 may have reduced sensitivity, especially in regions corresponding to the positioning of the first detector within the optical channel. One of skill in the art will recognize various arrangements for positioning the first detector 410 within the second optical channel 435 with minimal interference to the second detector 415. For example, some embodiments include a "spider" arrangement, wherein the first detector is suspended in position by one or more thin wires or rods. Thus, the shadow of the mounting mechanism holding the detector in position can be minimized. It should also be mentioned that as in embodiments described above, the detectors 410, 415 can include detectors having different active ranges or sizes. For example, the first detector can be smaller than the second detector.

Additionally, FIG. 4 illustrates how a device having both a close focus optical profile 430 and standard focus optical profile 435 can be used to select a best fit optical profile for taking a particular reading. Here a small object 439 has been positioned at a distance $D_{FP}$ from the objective lens system 450. At this location, the standard focus measurement spot size as indicated by optical profile 435 is larger than the object 439. Thus, a standard focus measurement of this object at this location would include extraneous information that could affect the accuracy of the reading. The close focus measurement zone 430, however, can be seen to better match the size and profile of the object 439. Thus in this case, the close focus reading can represent a more accurate determination of the temperature of the targeted object 439. By contrast, with respect to object/target scene 437 at a distance $D_{TS}$ from the objective lens 450, the close focus measurement zone is much too large due to the characteristic bow-tie shape of the close focus optical profile 430. However, the standard focus arrangement 435 causes a much more gradual increase in the measurement spot size as the distance D from the objective lens 450 increases. Accordingly, the standard focus arrangement generally provides a better fit measurement zone for objects 437 further from the device. By simultaneously providing both close and standard focus functionality, devices according to embodiments of the invention can allow the user to select which reading to utilize to take a reading that best fits the object being tested and minimizes inclusion of extraneous or background scene information. Moreover, some devices can include control circuitry or software to automatically selects the better fit reading for temperature determination and presents indicates the more appropriate reading.

FIG. 4 further indicates that some embodiments include a crossover point 438 at some distance $D_C$ from the lens 450. A crossover point can occur in devices having any combination of optical profiles. In this example, the initially narrower profile close focus profile 430 begins to widen after the focus plane distance $D_{FP}$, such that after the crossover distance $D_C$, it is wider than the initially broader standard focus profile 435. As another example, the embodiment of FIG. 2 would have a crossover point located at a distance off of the right side of the page. As previously described, embodiments of the invention provide a device having multiple measurement spot sizes at substantially any given distance from the lens. Thus, the term "substantially," in this context, should be understood to mean any distance from the lens with the exception of crossover points. For this reason, in embodiments including a crossover point, one should take care to select optics such that the crossover point occurs at a non-critical or generally undesirable measurement distance. For example, in devices with contemplated measurement distances from 10 to 100 inches, a crossover point should be selected at a distance of less than 10 inches or greater than 100 inches.

Figure 5:
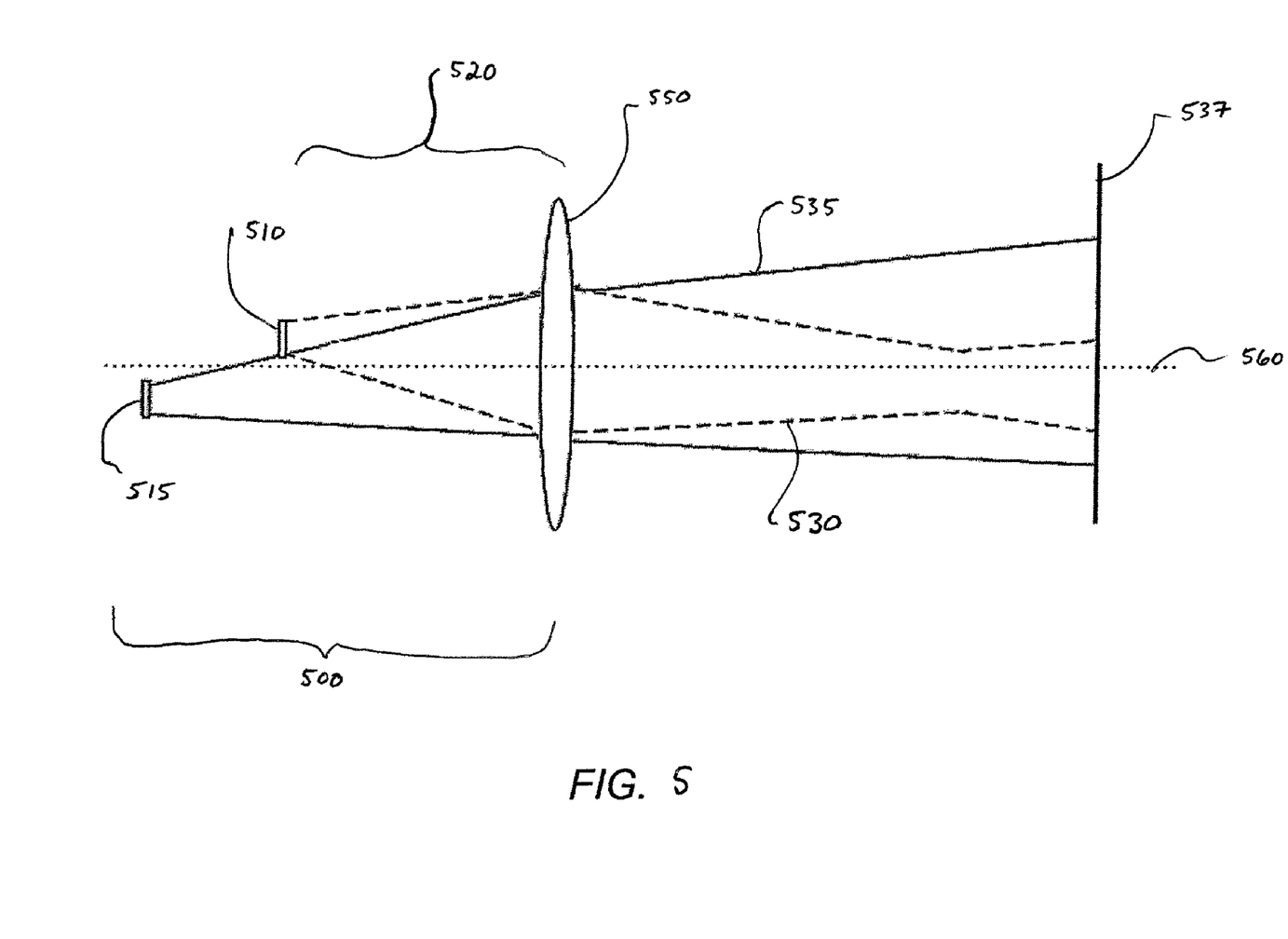
FIG. 5 is shows a schematic representation of a device for temperature measurement according to some embodiments of the invention.
Figure 6C:
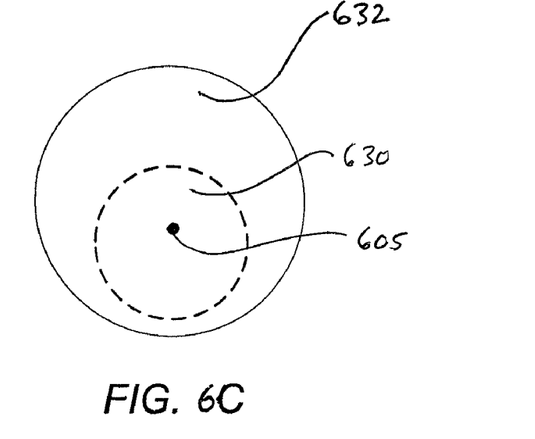

FIG. 5 shows another schematic of a device 500 according to an embodiment that does not include a beam splitter. Here, the detectors 510, 515 are positioned at different distances $D_1$, $D_2$ and both are offset from the optical axis 560. As a result, the first and second optical profiles 530, 535 are offset from the optical axis 560 along its length. Thus, the resultant measurement zone pattern corresponds generally with that shown in FIG. 6C where both the first measurement zone 630 and second measurement zone 632 are offset from the optical axis 605. One difference between this embodiment and that of FIG. 4 that should be pointed out is that here, neither detector resides within the optical channel of the other. Thus, each detector receives a complete, unobstructed image of the target scene or object 537. Of course, one should recognize numerous variations and combinations of the offset configuration shown. For example, the detector distances $D_1$, $D_2$ could be the same, or differently arranged so as to provide for, as an example, two offset standard focus profiles. Additionally, the detectors can be sized differently, offset in larger or smaller amounts from the optical axis, or offset horizontally and or vertically from the optical axis. The detectors need not be offset the same amount from the optical axis or remain generally perpendicular to the axis as do the detectors shown in FIG. 5.

Figure 7:
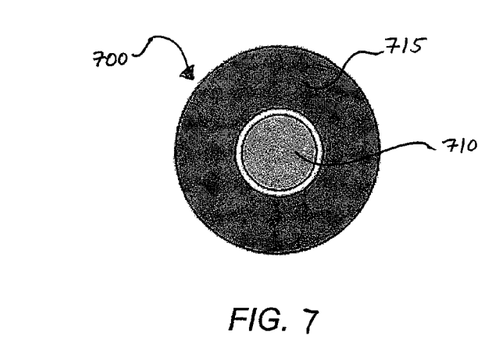
FIG. 7 shows a representation of an infrared spot detector with multiple regions according to some embodiments of the invention.
Figure 8:
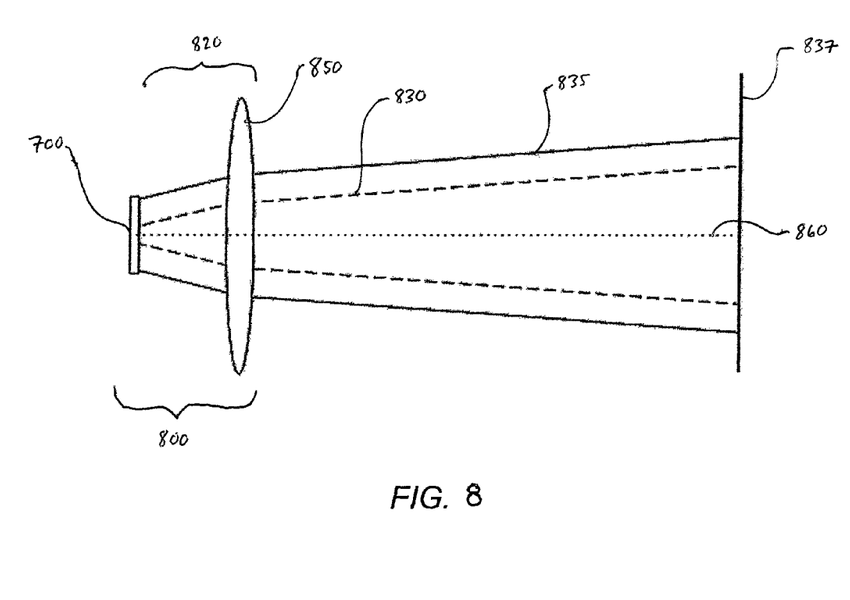
FIG. 8 shows a schematic representation of a device for temperature measurement including the detector of FIG. 7 according to some embodiments of the invention.

In other embodiments, devices according to the invention can include a specialized detector having multiple detector zones. FIG. 7 shows a top plan view of such a detector. As can be seen from this view, the detector 700 includes at least two detector regions 710, 715 each region comprising a single device and being capable of producing a signal representative of the IR radiation received across the device surface. In FIG. 7, the detector includes an inner region 710 and a concentric outer region 715. The optical profiles 830, 835 corresponding with each detector region can be seen in the schematic of FIG. 8 with respect to device 800. In this arrangement, the detector 700 is oriented relative to the objective lens system 850 such that each detector region provides standard focus functionality. The resultant effect of using a detector such as that of FIG. 7 is an optical profile similar to that of FIG. 3, where two different sized detectors were positioned equidistant from the lens system. Specialized detectors can provide detector regions of varying shape and can thus be designed for use with a variety of applications.

It should be recognized that any of the above embodiments can be adapted to include more than two detectors. For example, embodiments including a beam splitter can include a rotating mirror configured to direct image radiation upon a plurality of detectors fixed at angles relative to the optical axis. Such a system can be calibrated to take time multiplexed readings of the image scene. Embodiments not including a beam splitter can include a plurality of detectors arranged about and offset from the optical axis to provide any number of simultaneous measurement zones. Such systems can be specifically designed for particular applications and target objects.

Embodiments can include sighting means for determining where the measurement zones are located relative to the target scene or object. The sighting means can include any means for indicating the size of one or more of the measurement spots in context so that a user can properly aim the device. Examples of sighting means include means which project an indicator onto the target scene, means which present an intermediate visual indicator between the device and target, and overlay means.

Projected indicator means can include, for example, laser sighting as commonly known and used in the art. In such embodiment, the multiple measurement zones can be indicated by projecting visible laser energy onto the object itself. For example, a crosshair laser pattern can be projected for close focus and a border pattern can be projected for standard focus. Other projected indicators can include a visual light beam pattern filling the measurement zone(s).

Intermediate visual indicator means can include, for example, a reticle or other scope on the device. Such an example can be thought of as similar to a rifle scope, wherein a user can look through or around the intermediate visual indicator means and view the target scene with the indicator in the foreground identifying the measurement zone(s).

Overlay sighting means can include, for example, a video overlay system as known in the art. One example of a video overlay system is described in commonly owned U.S. Patent Application Number 2006/0152737. In such a system, the device includes a visual light camera and video monitor for displaying a visual representation of the target scene. Software instructions are used to position a pattern overlay on the video image of the target scene that corresponds with the measurement zone. In such embodiments, a processor and instruction set may need to be provided to calculate the appropriate size and positioning of the overlay on the scene image. In addition, such methods may require a laser or other distance measurement technique for determining the distance from the objective lens to the target scene.

The detectors and optical system of devices according to embodiments of the invention can be installed within a device housing. In some embodiments, the non-contact temperature measuring device is a hand-held device. A housing for such a device is suitably sized and includes features such as, for example, a grip or handle, so as to be readily held and maneuvered by a user. A device housing should include appropriate mounting facilities to position the detectors and components of the optical system according to the requirements of the optical system. In addition, some devices include analog and/or digital components to provide for local processing and display of the signals produced by the detectors. The housing may further include a trigger or other buttons for capturing a temperature reading or activating other functions. And embodiments including a sighting means, such as those described above, can include components specific to the sighting mechanism, such as an LCD display, laser sources, or reticles. Moreover, devices according to the invention can be portable, such devices including a battery housing or other portable power source.

Additionally, embodiments of the invention can be non-portable. Such devices can be installed within other devices or part of larger a larger system requiring non-contact temperature measurements. For example, embodiments of the invention can be fixed relative to a belt or assembly line for taking optical readings of properties of objects thereon.

Thus, embodiments of the multizone non-contact spot thermometer are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A non-contact measurement device comprising:
    a first detector for sensing scene data from a first measurement zone within a target scene and generating a first signal corresponding to the sensed data;
    a second detector for sensing scene data from a second measurement zone within the target scene and generating a second signal corresponding to the sensed data; and
    an optical system for imaging scene data from the target scene onto the detectors, the optical system comprising an objective lens system,
    wherein the optical system images the scene data from the first measurement zone onto the first detector and the scene data from the second measurement zone onto the second detector, and
    wherein the sizes of the first and second measurement zones vary with distance from the objective lens system according to first and second optical profiles, such that at substantially any given distance from the objective lens system the first measurement zone size is different from the second measurement zone size.

2. The device of claim 1, wherein one or more of the detectors are infrared (IR) detectors.

3. The device of claim 2, wherein one or more of the IR detectors are thermal detectors.

4. The device of claim 2, wherein one or more of the IR detectors are photon detectors.

5. The device of claim 1, wherein the detectors are fixedly positioned within the device.

6. The device of claim 1, wherein the first and second detectors are of different sizes.

7. The device of claim 1, wherein the sensed data is infrared radiation.

8. The device of claim 1, wherein the first and second signals correspond to the temperature of the target scene within the first and second measurement zones, the device thus comprising a non-contact thermometer.

9. The device of claim 1, wherein the optical system further comprises:
    a beam splitter positioned on an optical axis defined by the optical system and oriented to direct the scene data onto each of the detectors.

10. The device of claim 9, wherein the beam splitter comprises a partially transmissive mirror angled relative to the optical axis.

11. The device of claim 9, wherein the beam splitter comprises a rotating mirror.

12. The device of claim 1, wherein the
    first detector and the second detector are positioned relative to an optical axis defined by the optical system.

13. The device of claim 12, wherein the detectors are positioned such that a central axis of each of the detectors is generally coaxial with the optical axis, each detector being positioned at a different distance from the optical system.

14. The device of claim 12, wherein at least one detector is positioned such that a central axis of the detector passes through the optical system at an angle relative to the optical axis.

15. The device of claim 12, wherein the detectors are positioned such that none of the central axes of the detectors are coaxial with the optical axis.

16. The device of claim 1, wherein the optical system further comprises:
    positioning of the detectors relative to the optical system and an optical axis defined by the optical system; and
    a beam splitter positioned on the optical axis and oriented to direct the scene data onto each of the detectors.

17. The device of claim 1, wherein the objective lens system is a refractive system comprising:
    one or more lenses.

18. The device of claim 1, wherein the objective lens system is a reflective system comprising:
    one or more collecting mirrors.

19. The device of claim 1, wherein one or more of the optical profiles is a close focus optical profile.

20. The device of claim 1, wherein one or more of the optical profiles is a standard focus optical profile.

21. The device of claim 1, further comprising a sighting means for identifying the position and size of the measurement zones within the target scene.

22. The device of claim 21, wherein the sighting means comprises a projected indicator sighting means.

23. The device of claim 21, wherein the sighting means comprises an intermediate visual sighting means.

24. The device of claim 21, wherein the sighting means comprises an overlay sighting means.

25. A non-contact temperature measurement device, comprising:
    a first infrared (IR) detector for sensing IR radiation from a first measurement spot within a target scene and generating a first signal corresponding to the sensed IR radiation;
    a second IR detector for sensing IR radiation from a second measurement spot within the target scene and generating a second signal corresponding to the sensed IR radiation; and
    an optical system for imaging IR radiation, wherein the optical system defines an optical axis and images the IR radiation from the first measurement spot onto the first IR detector and images the IR radiation from the second measurement spot onto the second IR detector, and wherein the optical system is configured to image a different optical profile to each IR detector, such that at substantially any given distance from the optical system the size of the first measurement spot does not equal the size of the second measurement spot.

26. The device of claim 25, wherein the infrared detectors are thermal detectors.

27. The device of claim 25, wherein the device further comprises a hand-held housing, the detectors and optical system being coupled thereto.

28. The device of claim 25, wherein the optical system comprises:
a beam splitter positioned on the optical axis and oriented to direct the IR radiation onto the first and second IR detectors.

29. The device of claim 25, wherein the first and second infrared detectors have different active diameters.

30. The device of claim 25, wherein at least one of the optical profiles is close focus.

31. The device of claim 25, wherein at least one of the optical profiles is standard focus.

32. The device of claim 25, further comprising at least one additional detector.

33. The device of claim 25, wherein the measurement spots at least partially overlap.

34. The device of claim 33, wherein one of the measurement spots is entirely within another of the measurement spots.

35. The device of claim 34, wherein the measurement spots are concentric.

36. A hand-held device for infrared temperature measurement comprising:
an infrared detector comprising (i) a first detector region for sensing infrared radiation from a first measurement zone within a target scene and generating a first signal corresponding to the sensed infrared radiation, and (ii) a second detector region for sensing infrared radiation from a second measurement zone within the target scene and generating a second signal corresponding to the sensed infrared radiation; and an optical system comprising an objective lens system, wherein the optical system images the infrared radiation from the first measurement zone onto the first detector region and images the infrared radiation from the second measurement zone onto the second detector region, and wherein the optical system is configured to image a different optical profile to each detector region, such that at substantially any given distance from the objective lens system the size of the first measurement zone does not equal the size of the second measurement zone.

37. The device of claim 36, wherein the first detector region is positioned completely within the second detector region.

38. The device of claim 36, wherein the first measurement zone is central and concentric with the second measurement zone.

* * * * *